(12) United States Patent
Mack

(10) Patent No.: US 10,861,067 B2
(45) Date of Patent: *Dec. 8, 2020

(54) SYSTEMS AND METHODS FOR INTERNATIONAL DUTIABLE RETURNS

(75) Inventor: Dennis Mack, Marietta, GA (US)

(73) Assignee: united parcel service of america, inc, Atlanta, GA (US)

(*) Notice: Subject to any disclaimer, the term of this patent is extended or adjusted under 35 U.S.C. 154(b) by 235 days.

This patent is subject to a terminal disclaimer.

(21) Appl. No.: 13/073,056

(22) Filed: Mar. 28, 2011

(65) Prior Publication Data

US 2011/0173129 A1    Jul. 14, 2011

Related U.S. Application Data

(63) Continuation of application No. 11/765,266, filed on Jun. 19, 2007, now Pat. No. 7,937,331.

(Continued)

(51) Int. Cl.
*G06Q 30/06* (2012.01)
*G06Q 10/08* (2012.01)
*G06Q 20/20* (2012.01)

(52) U.S. Cl.
CPC ............ *G06Q 30/06* (2013.01); *G06Q 10/08* (2013.01); *G06Q 10/0837* (2013.01); *G06Q 20/209* (2013.01)

(58) Field of Classification Search
CPC .... G06Q 10/0837; G06Q 30/06; G06Q 10/08; G06Q 20/209

(Continued)

(56) References Cited

U.S. PATENT DOCUMENTS 5,968,110 A * 10/1999 Westrope ............... G06Q 30/02
                                                          238/381
6,115,690 A *  9/2000 Wong ......................... 705/7.27
(Continued)

FOREIGN PATENT DOCUMENTS

WO    WO 2005/010727         2/2005
WO    WO 2005/010727 A2      2/2005

OTHER PUBLICATIONS

Xue-Ming Yuan, "Modeling returns of merchandise in an inventory system", published by OR Spektrum in 1998, all pages (Year: 1998).*

(Continued)

*Primary Examiner* — Omar Zeroual
(74) *Attorney, Agent, or Firm* — Shook, Hardy & Bacon L.L.P.

(57) ABSTRACT

A system and method is disclosed for facilitating international return of dutiable goods. A typical application involves a purchaser buying goods on-line, resulting in shipping the goods internationally to the purchaser. After receipt of the goods, the purchaser determines that return of the goods is necessary. The purchaser contacts the merchant selling the goods to request returning the goods. The merchant, in turn, communicates to the carrier delivering the goods that an international return is requested. The merchant provides certain information to the carrier allowing the carrier to make available the necessary documentation required by the customer to return the goods to the merchant. The documentation includes a properly completed commercial invoice that is made available to the consignee. The consignee can then sign and use the documentation for returning the item. The documentation may be variously provided to the customer either by the merchant or the carrier.

20 Claims, 6 Drawing Sheets

Related U.S. Application Data

(60) Provisional application No. 60/805,628, filed on Jun. 23, 2006.

(58) Field of Classification Search
USPC .......................................................... 705/340
See application file for complete search history.

(56) References Cited

U.S. PATENT DOCUMENTS

| | | | | |
|---|---|---|---|---|
| 6,463,421 | B2* | 10/2002 | Junger | G07F 7/06 |
| | | | | 705/28 |
| 6,970,855 | B2 | 11/2005 | Das et al. | |
| 7,058,581 | B1* | 6/2006 | Young | G06Q 10/08 |
| | | | | 221/7 |
| 7,266,513 | B2* | 9/2007 | Chalmers et al. | 705/26.1 |
| 7,455,226 | B1* | 11/2008 | Hammond | G06Q 10/087 |
| | | | | 235/385 |
| 7,596,500 | B1* | 9/2009 | Thompson | G06Q 30/0284 |
| | | | | 705/1.1 |
| 8,046,273 | B2* | 10/2011 | Welter | G06Q 30/0637 |
| | | | | 705/26.8 |
| 8,156,007 | B1* | 4/2012 | Anthony | G06Q 30/0601 |
| | | | | 705/26.1 |
| 9,984,351 | B1* | 5/2018 | Antony | G06Q 10/0837 |
| 2002/0010689 | A1* | 1/2002 | Tibbs | G06Q 10/08 |
| | | | | 705/408 |
| 2002/0019785 | A1* | 2/2002 | Whitman | G06Q 30/06 |
| | | | | 705/28 |
| 2002/0032612 | A1* | 3/2002 | Williams | G06Q 30/0601 |
| | | | | 705/26.1 |
| 2002/0120527 | A1* | 8/2002 | Lam | G06Q 30/0623 |
| | | | | 705/26.61 |
| 2002/0120567 | A1 | 8/2002 | Caplan et al. | |
| 2002/0152093 | A1* | 10/2002 | Chalmers | G06Q 10/08 |
| | | | | 705/26.1 |
| 2002/0152174 | A1* | 10/2002 | Woods | G06Q 10/08 |
| | | | | 705/60 |
| 2003/0040947 | A1* | 2/2003 | Alie | G06Q 30/06 |
| | | | | 705/28 |
| 2003/0074284 | A1 | 4/2003 | Bowden | |
| 2003/0135432 | A1* | 7/2003 | McIntyre | G06Q 10/087 |
| | | | | 705/28 |
| 2003/0144971 | A1* | 7/2003 | Das | G06Q 20/20 |
| | | | | 705/401 |
| 2003/0195784 | A1* | 10/2003 | Smith, Jr. | G06Q 10/087 |
| | | | | 705/28 |
| 2003/0195843 | A1* | 10/2003 | Matsuda | G06Q 30/08 |
| | | | | 705/39 |
| 2003/0217017 | A1* | 11/2003 | Willoughby | G09F 3/02 |
| | | | | 705/404 |
| 2003/0220855 | A1* | 11/2003 | Lam | G06Q 30/04 |
| | | | | 705/34 |
| 2003/0225625 | A1* | 12/2003 | Chew | G06Q 30/06 |
| | | | | 705/24 |
| 2004/0083233 | A1* | 4/2004 | Willoughby | G06Q 10/083 |
| 2004/0122690 | A1* | 6/2004 | Willoughby | G06Q 30/02 |
| | | | | 705/337 |
| 2004/0148052 | A1* | 7/2004 | Ferguson | G06Q 10/08 |
| | | | | 700/213 |
| 2004/0172260 | A1* | 9/2004 | Junger | G06Q 30/016 |
| | | | | 705/21 |
| 2004/0193436 | A1 | 9/2004 | Stashluk et al. | |
| 2004/0193438 | A1* | 9/2004 | Stashluk, Jr. | G06Q 30/016 |
| | | | | 705/304 |
| 2004/0194056 | A1* | 9/2004 | Combs | G06Q 30/016 |
| | | | | 717/104 |
| 2004/0212833 | A1* | 10/2004 | Taskett | G06Q 10/08 |
| | | | | 358/1.18 |
| 2004/0215531 | A1* | 10/2004 | Stashluk, Jr. | G06Q 10/087 |
| | | | | 705/28 |
| 2004/0243690 | A1* | 12/2004 | Hancock | G06Q 10/06315 |
| | | | | 709/219 |
| 2004/0267642 | A1* | 12/2004 | Stenz | G06Q 10/087 |
| | | | | 705/28 |
| 2005/0004894 | A1* | 1/2005 | Uy | G06Q 10/0875 |
| 2005/0021358 | A1* | 1/2005 | Uy et al. | 705/1 |
| 2005/0060165 | A1* | 3/2005 | Knight | G06Q 20/203 |
| | | | | 705/22 |
| 2005/0097139 | A1* | 5/2005 | Appelstal | 707/200 |
| 2005/0114221 | A1* | 5/2005 | Walters | G06Q 10/0837 |
| | | | | 705/340 |
| 2005/0119786 | A1 | 6/2005 | Kadaba | |
| 2005/0144059 | A1* | 6/2005 | Schuessler | G06Q 10/08 |
| | | | | 705/333 |
| 2005/0149453 | A1* | 7/2005 | Amling | G06Q 10/08 |
| | | | | 705/60 |
| 2005/0192816 | A1* | 9/2005 | Wechsel | G06Q 10/08 |
| | | | | 705/28 |
| 2005/0222853 | A1* | 10/2005 | Black | G06Q 10/0831 |
| | | | | 705/331 |
| 2005/0222911 | A1* | 10/2005 | Kerker | G06Q 30/02 |
| | | | | 705/26.1 |
| 2005/0228681 | A1* | 10/2005 | McMahon | G06Q 10/0833 |
| | | | | 705/333 |
| 2006/0036504 | A1* | 2/2006 | Allocca | G06Q 30/0601 |
| | | | | 705/26.1 |
| 2006/0116923 | A1 | 6/2006 | Woods et al. | |
| 2006/0149577 | A1* | 7/2006 | Stashluk, Jr. | G06Q 10/0837 |
| | | | | 705/340 |
| 2007/0055639 | A1* | 3/2007 | Garvey | B42D 15/006 |
| | | | | 705/410 |
| 2007/0267123 | A1* | 11/2007 | Chong | 156/60 |
| 2007/0282705 | A1 | 12/2007 | Chalmers et al. | |
| 2007/0299751 | A1* | 12/2007 | Jenkins | G06Q 40/123 |
| | | | | 705/31 |
| 2007/0299791 | A1* | 12/2007 | Mack | G06Q 10/08 |
| | | | | 705/402 |
| 2008/0120129 | A1* | 5/2008 | Seubert | G06Q 10/10 |
| | | | | 705/35 |
| 2008/0126157 | A1* | 5/2008 | Rousso | G06Q 10/087 |
| | | | | 705/348 |
| 2008/0255863 | A1* | 10/2008 | Mack | G06Q 10/10 |
| | | | | 705/1.1 |
| 2008/0288274 | A1* | 11/2008 | Roccagiovine | G06Q 10/08 |
| | | | | 705/1.1 |
| 2008/0294536 | A1* | 11/2008 | Taylor | G06Q 10/08 |
| | | | | 705/28 |
| 2008/0302866 | A1* | 12/2008 | Baugh | G06Q 10/08 |
| | | | | 235/375 |
| 2009/0076870 | A1* | 3/2009 | Hammond et al. | 705/7 |
| 2010/0057596 | A1* | 3/2010 | Sundel | G06Q 30/04 |
| | | | | 705/31 |
| 2010/0067041 | A1* | 3/2010 | Endruscheit | G07B 17/00508 |
| | | | | 358/1.15 |
| 2010/0145754 | A1* | 6/2010 | Rahman | G06Q 10/0837 |
| | | | | 705/340 |
| 2010/0145839 | A1* | 6/2010 | Lam et al. | 705/34 |
| 2010/0299278 | A1* | 11/2010 | Kriss | G06Q 10/0833 |
| | | | | 705/332 |
| 2011/0029429 | A1* | 2/2011 | Whitehouse | G06Q 20/10 |
| | | | | 705/39 |
| 2011/0066549 | A1* | 3/2011 | Whitehouse | G07B 17/00508 |
| | | | | 705/39 |
| 2011/0106714 | A1* | 5/2011 | Junger | G06Q 20/209 |
| | | | | 705/304 |
| 2013/0218723 | A1* | 8/2013 | Masud | G06Q 30/06 |
| | | | | 705/26.62 |
| 2013/0304663 | A1* | 11/2013 | Whitehouse | G06Q 30/06 |
| | | | | 705/333 |
| 2014/0058971 | A1* | 2/2014 | Muppirala | G06Q 10/0831 |
| | | | | 705/333 |
| 2014/0279440 | A1* | 9/2014 | Felix | G06Q 10/08345 |
| | | | | 705/39 |
| 2018/0053152 | A1* | 2/2018 | Chalmers | G06Q 30/0601 |

OTHER PUBLICATIONS

Notice of Allowance, dated Dec. 28, 2010, of corresponding U.S. Appl. No. 11/765,266, filed Jun. 19, 2007.

(56) References Cited

OTHER PUBLICATIONS

Office Action, dated Aug. 5, 2010, of corresponding U.S. Appl. No. 11/765,266, filed Jun. 19, 2007.
Office Action, dated Mar. 25, 2010, of corresponding U.S. Appl. No. 11/765,266, filed Jun. 19, 2007.
Office Action (Restriction), dated Jan. 27, 2010, of corresponding U.S. Appl. No. 11/765,266, filed Jun. 19, 2007.
Office Action, dated Jan. 27, 2011, of corresponding Chinese Application No. 200780023157.4.
International Search Report dated Sep. 22, 2008 of related international application No. PCT/US2007/14627, filed Jun. 22, 2007.
Canadian Intellectual Property Office, Requisition by the Examiner for Application No. 2,651,374, dated Mar. 21, 2014, 2 pages, Canada.
State Intellectual Property Office of the P.R.C., Search Report for Application No. 200780023157.4, dated Feb. 9, 2015, 2 pages, China.
State Intellectual Property Office of the P.R.C., Office Action for Application No. 200780023157.4, dated Aug. 11, 2015, 8 pages, China.
State Intellectual Property Office of the P.R.C., Office Action for Application No. 200780023157.4, dated Feb. 1, 2016, 21 pages, China.
State Intellectual Property Office of the P.R.C., Office Action for Application No. 200780023157.4, dated Jun. 27, 2016, 16 pages, China.
European Patent Office, Communication pursuant to Article 94(3) EPC for Application No. 07809836.5, dated Feb. 20, 2017, 7 pages, Netherlands.
State Intellectual Property Office of the P.R.C., Decision of Rejection for Application No. 200780023157.4, dated Jan. 20, 2017, 18 pages, China.

\* cited by examiner

COMMERCIAL INVOICE — 102
ConnectShip
8282 S. Memorial Dr. — 104
Suite 400
Tulsa, OK 74135
USA

REMIT TO — 106

FranceCo
250 Rue La Fayette
Paris 75010, France

BUYER — 110

FranceCo
250 Rue La Fayette
Paris 75010, France

CONSIGNEE — 108

Gallic Imports
122 Chateau Nord
Building 12

Orsay 69400, France

| Invoice No.<br>100240 | Date Shipped<br>10-03-1996 |
|---|---|
| Our Reference<br>88359350 | Customer Reference — 112<br>12-2501295 |
| Shipped Via<br>UPS Ref No. 1Z 123456-7890 | |

— 113

| Quantity | HTC | Description | Unit Price | Amount — 120 |
|---|---|---|---|---|
| 15 EA | 12345678.90 | Ultra UltraWidget Plus<br>(Source - United States) — 116 | 134.99 — 118 | 2024.85 |
| — 114 | — 115 | | | |

Comments
Thank you for your order. To
re-order call 1-800-555-5059

| | | | Miscellaneous Charges | — 122 |
| | | | Sales Tax | 34.56 |
| | | | VAT | 120.00 — 124 |
| | | | INVOICE TOTAL | USD 28995.41 — 126 |

TERMS DDU Paris
These commodities licensed by the United States for ultimate destination France Diversion contrary
to U.S. law prohibited.

| I Hereby Certify that this invoice is true and<br>correct<br>signature | Title<br>Export Manager | Date — 128<br>10-03-1996 |
|---|---|---|

[Fred Archer]

SYSTEMS AND METHODS FOR INTERNATIONAL DUTIABLE RETURNS

CROSS-REFERENCE TO RELATED APPLICATIONS

This application is a continuation of U.S. patent application Ser. No. 11/765,266 filed Jun. 19, 2007 and this application claims priority to provisional U.S. patent application Ser. No. 60/805,628, entitled Systems and Methods for International Dutiable Returns, filed on Jun. 23, 2006, the contents of both applications are incorporated herein in their entireties by reference.

BACKGROUND OF THE INVENTION

The volume of international commerce has grown significantly in the recent past. Whereas once only large multi-national companies imported/exported goods across borders, the growth of the Internet and e-commerce has lead to many small business and individuals shipping goods internationally.

The prevalence of on-line merchants and the reach of the Internet has facilitated shopping and purchasing on a world-wide basis. Thus, individuals in any number of countries can readily purchase goods on-line. Various package delivery providers ("carriers"), such as UPS, provide worldwide delivery of such purchased items in a timely and cost-effective manner. Thus, an individual in Europe can readily purchase a good, such as a book, from the web site of a U.S. merchant or vice versa. Whereas prior international purchases were usually accomplished by companies using financial instruments known as "letters of credit", individuals today can purchases goods using a credit card, allowing the good can be purchased, picked, packed, and delivered to a package delivery provider or carrier within 24 hours of receipt of order.

International goods shipment, however, is relatively more complex than shipping goods domestically. International shipping requires a number of documents that are not required domestically. First and foremost, a commercial invoice is required. The commercial invoice indicated the purchaser and seller of the goods, and what exactly is being conveyed. The contents of the commercial invoice are prepared by the shipper (consignor). In the above example, the web-based merchant would prepare the commercial invoice, along with other necessary documentation, and prepare the package for delivery by the package carrier.

The merchant may be familiar with the procedures for handling an international shipment, and may rely on various services provided by third parties. For example, customs agents and other providers may assists in the proper completion of the forms. If the merchant has shipped the information previously, then the merchant may be familiar with the necessary procedures and have possession of the required information. The consignee (e.g., the recipient of the package) typically is not required to perform any special actions in order to accept the package.

It is not uncommon in transactions between the merchant and the buyer that the goods are deemed unsatisfactory, for any number of reasons. The merchandise may not be suitable for the purposes intended, or no longer needed. For whatever reasons, the purchaser, after accepting the package, may decide to return the good to the seller. Now, the purchaser becomes the shipper of the good and the merchant is the consignee (the recipient of the package). This places the purchaser in the position of having to ship the goods internationally back to the merchant. Further, the purchaser must know comply with the various requirements associated with international shipping. One of these requirements is to provide a proper commercial invoice.

In order to facilitate international return of goods, systems and methods are required for assisting purchasers of these goods in returning the goods.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates one embodiment of a commercial invoice;

DETAILED DESCRIPTION OF THE INVENTION

Figure 2:
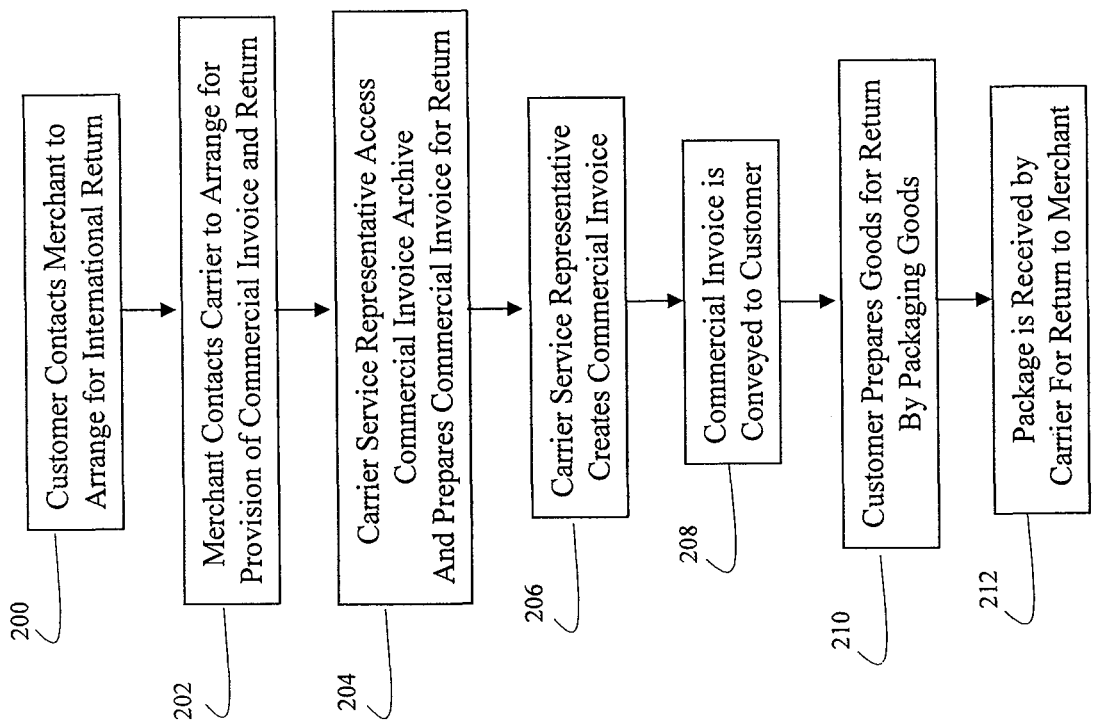
FIG. 2 illustrates at a high level the steps performed in conjunction with practicing one embodiment of the present invention.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As used herein, the "consignor" is a person or entity that originating the shipment of a good, also sometime referred to as the "shipper." The service provider conveying the good, or "carrier", provides the delivery of the good. (Although individuals may sometimes refer to the carrier as a "shipper", that meaning of the word is not used as such herein). Although multiple carriers may be involved, typically a single carrier is responsible overall for conveyance of the good. The person or entity receiving the good is the consignee.

For purposes of illustration, consider an example of an individual (the purchaser or customer) who is purchasing an item, such as a book, from an e-tailer or web-based merchant. The purchaser goes on-line to the merchant's web site, selects a book, and orders it. Payment is typically made via electronic means (e.g., a credit card), and the customer provides the appropriate identification and address information. Typically, the purchaser's address is also the shipping address. In this example, the purchaser is located in one country, and the merchant is located in another country (alternatively, the item ordered is shipped from another country relative to the purchaser).

The purchaser receives the book, and for any number of reasons, the item is not satisfactory to the purchaser. Perhaps, for example, the merchant picked the incorrect book title and shipped it to the purchaser. Typically, the purchaser communicates their dissatisfaction to the merchant, and is instructed to return the merchandise to a designated location. In some cases, the merchant may provide a Return Merchandise Authorization Number (RMA number) to the customer. The RMA number signifies to the merchant that authorization to return the merchandise was granted and identifies information associated with the return of the item.

This, however, leaves the customer to navigate the requirements of the international shipment process in order to return the good back to the merchant. Unlike shipping a domestic package, international shipments require specific documentation in order to clear customs. One such document that is always required is a commercial invoice. The commercial invoice is a document evidencing a transaction between the consignor (shipper, or in the above example, the customer returning the good) and the consignee (recipient, or in the above example, the merchant receiving the good). The consignee is shipping and therefore exporting the good, and the consignor is receiving, and therefore importing the good.

As expected, the commercial invoice requires information to be provided by the consignor. Some of the information required pertains to the consignor and consignee, including the respective name, address, and other contact information. At this point, an unsophisticated customer would not necessarily know the distinction between the terms "consignor" and "consignee." Although the meanings are not complicated, they may not be readily understood by the purchaser. While the customer typically understands the concepts of "customer" and "merchant", most customers would not know the more precise terms of "consignor" and "consignee."

In addition to providing information of the consignee and consignor, the commercial invoice also identifies the goods being shipped. A representative embodiment of a commercial invoice is shown in FIG. 1. A commercial invoice is not the same as an invoice typically issued in domestic purchases, but provides additional information required by government agencies (e.g., customs). The commercial invoice categorizes the goods via an internationally defined system of goods classification, and indicates a code for each type of good. This system is called the harmonized tariff system ("FITS") and lists various harmonized tariff codes ("HTC" or "HT" codes) or simply tariff codes ("HTC" or HT Codes"). These codes comprise an internationally defined portion and a nationally defined portion. The classification of goods is vast, and determination of the appropriate code for a particular object may not be a simple task. In fact, the allocation of the proper HT code for a good can be very complex and this is often the case for consumer goods, such as clothing. The HT Code is not likely to be known by the purchaser and is usually not indicated on a regular (e.g., non-commercial) invoice. While the tariff code classifies goods, it is usually not used by the merchant to identify a particular good, and thus a merchant could typically not use the HTC as a inventory or stock keeping unit code.

The various fields of an (original) commercial invoice are shown in FIG. 1. (This will be further distinguished from a return commercial invoice.) Typically, the commercial invoice will be identified as such 102, using the words "commercial invoice." The seller of the goods 104 is identified along with the entity to which payment should be remitted 106. The buyer 110 is also identified, which may not be the same entity to which the goods are shipped to, which is the consignee 108.

Further information 112 identifying the invoice is provided, such as a commercial invoice number, a sellers reference number, a purchaser's reference number, and information as to when and how the goods are shipped, including a carrier's reference number (also referenced herein as a tracking number). These various reference numbers provide ease of identification of the appropriate records for the purchaser, seller, and transportation provider. Typically, each party (the customer, merchant, and carrier) each desires the ability to defined and allocate a reference number to a particular transaction. Thus, a commercial invoice may reflect a purchase order number (a buyer's or consignee's reference number), and a carrier's tracking number (a carrier's reference number associated with the shipment). The merchant's number (which is the consignor) could be the commercial invoice number itself. Because of the need to relate the transaction to each of the various combinations of parties, there is typically a need to do so on an automated basis. As will be seen, there may be additional reference numbers defined, and mechanisms are defined for linking, correlating, or associating (e.g., being able to identify a related) reference number with another.

As will be seen, some common instances of linking numbers are a merchant linking a commercial invoice to a tracking number (so as to identify the shipment fulfilling an order). A merchant may also find it desirous to link a return commercial invoice reference number (e.g., the invoice associated with the return of the goods) with the tracking number of the return shipment (so as to track whether a return good has been shipped). Other combinations are possible. For example, a carrier may desire to link an original tracking number (associated with the original shipment of the goods) with the original commercial invoice number, as well as with the return commercial invoice number and return tracking number.

The commercial invoice also must identify the goods with a certain level of particularity. Thus, a quantity indication 114 (which also indicates a unit of measure) along with a description of the goods 116 is provided. Further information on the commercial invoice includes the unit price 118 of the goods and the total amount 120.

The commercial invoice also includes separate line items 122 for sales taxes, duties, tariffs 124 which are specific to the country into which the goods are being imported and other charges, such as other shipping related charges. The total amount (e.g., value of the goods) 126 is provided along with an indication of the appropriate currency being used (which are U.S. dollars in the example shown in FIG. 1). Finally, a date 128 and signature (certification statement) 130 is also provided. It required that each commercial invoice be certified, which requires a signature of some form.

The commercial invoice is used, in part, by customs officials to verify the contents of the shipment and verify that the appropriate duties for each of the items, based on the HTC code, are collected. A regular invoice evidencing the sale of a good is not required to have HT codes, nor certain other aspects, including the certification statement. The certification statement can be a physical or electronic signature, and certifies that the invoice is accurate and that the contents of the shipment conforms with the information provided. Consequently, the certification statement is usually signed by an individual associated with the consignor, who packaged up the good.

As evident, the commercial invoice comprises information which a purchaser may not readily know and information which the purchaser returning a good would likely not know at all. For example, the purchaser of a good may not readily know how to accurately describe a good according to the HTC system, what is the appropriate HTC code, or what is the appropriate country of origin. The origin of the goods is not the country of where the good is shipped from, but the origin of manufacture. For many goods, this may not be clear, as the components may be made by various countries, and then assembled into sub-assemblies, and further assembled in yet another country. In addition, a purchaser returning a good would not be knowledge of other required information, including transportation related information such as the port of entry of the goods, flight or vessel identification, etc.

While a purchaser returning a good could simply copy the information on the original commercial invoice, this may be difficult if the purchaser has misplaced the original copy. Even if the same information is used, it would be incorrect to simply reference the same information used to originally ship the goods (for example, the date, port of entry, and carrier tracking number would likely be different). Typically, the purchaser returning a good would have to coordinate with the various shipping carriers to ascertain the information so as to properly fill out the form. In summary, completing a commercial invoice form can be a complex activity, and typically beyond the skills and knowledge of the typical merchant's customer wishing to return the item.

In addition, there may be other forms that are required. If the value of certain goods is more than $2500.00, then a Shippers Export Declaration (SED) may be required. The rules again for determining whether a SED is required are not typically known by the consignee. Further, even if the rules are made known to the consignee, the consignee may not always know the required information. Based on the type of materials being returned, various other forms maybe required. For example, if the items are organic (e.g., food or plant materials), then various other forms issued by the FDA (Food and Drug Administration), USDA (U.S. Department of Agriculture), Fish and Wildlife, etc. may be required. Other items having potentially military use, require forms issued by the DOD (Department of Defense) or State Department. If the shipment is to be sent via international air transport, then an international Air Waybill is also required. Again, the information for filing out these forms may readily be beyond the knowledge of the purchaser. The carrier may supplement the commercial invoice with other appropriate forms based on analysis of the HTC codes indicated in the return commercial invoice.

Finally, the appropriate forms may be dependent on the country to which the purchaser is returning the goods to or exporting from. For example, returning a book to a merchant by shipping the book from the U.S. may be different than if the book is to be returned to a location in another country (perhaps a warehouse located in a country closer to the purchaser).

While a variety of different forms may be involved in returning a good internationally, the commercial invoice is usually a common requirement whereas the other forms are predicated by the type of goods indicated on the commercial invoice. Thus, the principles of the present invention are illustrated by focusing on a commercial invoice but other embodiments may involve processing other forms either in lieu of a commercial invoice, or in addition to a commercial invoice.

At a high level, a solution to avoiding the customer from completing the necessary forms is based on using information generated by the merchant when the original forms were completed when fulfilling the customer's order and adding other information known by a carrier. One aspect of the present invention is to store the information associated with the original commercial invoice and provide easy identification of the appropriate information of the goods so that the return forms for the specific returned goods are completed by others, not the customer. Once completed, the appropriate documentation is provided to the customer and used by the customer when returning the merchandise.

One embodiment is disclosed in FIG. 2. In FIG. 2, the process begins at step 200 when the customer contacts the merchant to arrange for the return of the good(s). Because the return involves shipping the good across an international border, this is an "international return", which is distinct from a domestic return. The process begins with the customer contacting the merchant in one of several ways, based on any of the commonly available communication forms, including telephone, email, transmittal of information by accessing a web site, faxing, etc. Typically, the most common forms involve telephonic and web-site access. In a telephonic access, the customer will typically dial a toll free number, identify themselves and their order. In other approaches, the customer will access a web site of the merchant, and indicate that they wish to institute a return. The web site will interact with the user and prompt the customer for certain information in order to identify the items being returned. Such prompts may include invoice number, customer number, customer name, order date, merchandise identifier, etc. Not all information is required, but sufficient information is requested to identify the order and the goods potentially involved.

The customer must also identify specifically which of the items ordered are to be returned. This is so because the commercial invoice must detail and describe the contents of the package with a certain level of particularity. Thus, only those goods indicated by the customer as being returned are indicated on the return commercial invoice and should be included in the package upon return.

Once the customer has indicated a desire to return certain goods, the next step occurs at step 202. This involves communication between the merchant and a carrier to arrange for a return of the good(s) across international borders. It is presumed, but not required that the carrier originally delivering the good is the same carrier that is handling the return of the good. Again, contact between the merchant and the carrier can occur by various forms, including telephonic or computer. As it will be readily seen, many of the functions performed by the merchant interacting with a customer service agent can be handled by using computing systems communicating via an application program interface (API) or other means. For sake of illustration, it is presume the merchant is communicating with a customer service representative. The merchant must provide sufficient information to the carrier to identify the original commercial invoice associated with the shipping of the original goods.

This can be done by providing the carrier with a package tracking number of the original shipment, the original commercial invoice number, or other identifying information.

The other identifying information provided by a merchant could be a "return material authorization ("RMA") number. In some merchant systems, the determination of the return commercial invoice number is a separate process from allocation the RMA number. Thus, the merchant may identify the return transaction using a RMA number, and use that to reference the transaction to the carrier. If so, the carrier then needs to link the RMA number with the return commercial invoice number and/or the return shipping tracking number.

Another form of other identifying information could be a third-party returns processing number ("RPN"). In this case, this number is used by a third party returns processing agent, to which the merchant has directed the returned good to be shipped to. There are various third party returns processing entities, which receive returns from a merchant, inspect the goods, aggregate the goods, or otherwise process the goods on behalf of the merchant. The third party returns processor may allocate a set of RPN numbers to the merchant for the merchant to use when issuing returns. This allows the merchant to track the returned once the good is received by the third party returns processor. This number is typically not used by the carrier in tracking the package as it is sent to the third party processor, but the carrier may link the RPN number with the commercial invoice, as it would do so with the RMA number. In some embodiments, a plurality of merchant defined codes or numbers could be used by the merchant, and the carrier would link any or all of these to the return commercial invoice number and/or return shipping tracking number.

So as to avoid confusion between a RMA and RPN, the term "return processing number" is used herein to broadly refer to any type of RMA or RPN, or any other return related number provided by the merchant (to either the customer or the carrier, or a third party returns processor, or all or part thereof) that is associated with the return transaction, and used by the merchant to identify the return transaction. A label can be generated reflecting such a return processing number and this label is termed a return processing label and would encompass RMA labels, RPN labels, or other return related labels. The term "label" used herein is not limited to a paper-based label, but can include other machine readable technologies, At the next step, step 204, the carrier service representative ("CSR") uses the information to access a commercial invoice archive, in order to retrieve information. The CSR uses a system, called the international dutiable returns ("IDR") system to perform this and the following functions. The CSR is typically able to retrieve either an image, or information indicated thereon, of the original commercial invoice. The IDR system also allows the CSR to use the information on the original commercial invoice to create the information for the return commercial invoice. In other cases, the IDR system allows the CSR to overwrite or update certain fields, such as provide an updated consignee address as well as indicate which items are to be returned. A variety of known approaches for interacting with the CSR, including graphics based human-machine interfaces may be used.

In other embodiments, in addition to creating a return commercial invoice, the system or CSR could also create a return shipping label and/or a return processing label for the customer as well.

In other embodiments, the customer may receive a return shipping label and a return processing label automatically with the order. However, a return commercial invoice usually cannot be provided, because the returned items are required to be indicated. In some embodiments, a partially completed return commercial invoice could be provided, or if there is only one item shipped, a default return commercial invoice could be generated and provided to the customer along with the original shipment (in anticipation of a return). This embodiment is not preferred, but is within the scope of the principles of the present invention. Since typically the vast instances of items shipped are not returned, doing so would generate information, which would not be used if the items were not returned.

Next, at step 206, the CSR causes the return commercial invoice ("RCI") to be generated. As it will be seen, different forms of the commercial invoice can be generated, including paper-based or electronic forms. The forms may be customized for each specific country to which the returned goods are being shipped. Although not shown, the system will check various rules appropriate for the generation of the return commercial invoice, including ensuring the goods are not restricted from being returned and/or calculating a duty associated therewith. Typically, the system will verify that the goods being returned were originally listed on the original commercial invoice. The other fields on the commercial invoice are also populated, using either information from the original commercial invoice, information provided by the merchant, and/or information known to the carrier.

Next, at step 208, the return commercial invoice is generated having the information properly completed to reflect the goods being returned by the customer. The commercial invoice (and any other associated documents) is generated and conveyed to the customer. The return commercial invoice can be conveyed electronically, via email, file transfer, or HTML data transfer, or the transfer can be physical—e.g., paper based. In one embodiment, the return commercial invoice (as well as return shipping label, instructions, RMA barcode label, and/or other forms) are collected into a envelop and sent to the customer. Typically, the documents and associated instructions are collected into a letter-sized pack, which the carrier then transports to the customer using the carrier's own delivery services. Variations are possible, including the carrier printing out the forms in a location in the same country as the customer, where a postal service or other delivery service is used to delivery the appropriate forms.

In step 210, the customer receives the appropriate forms, prepares the goods for return as instructed, and completes the forms. This largely entails signing the forms to attest to their accuracy. The contents of the commercial invoice must match with the contents of the package. Typically, the carrier does not sign the forms, but only prepares the forms for signing by the customer. If a return shipping label is provided (which can be a prepaid shipping label), the customer can affix the label to the package as well. In some embodiments, the return shipping label bears a tracking number of a different format (or from a different numbering space). This is because some carriers may allocate tracking numbers from different numbering spaces based on the country the consignor is located in. Further, other labels, which may be provided to the customer which are bearing machine readable indicia, such as bar codes representing the RPN or RMA number, can be affixed to the package as well.

Finally, in step 212, the package, once prepared and ready, is received by the carrier and delivered to the merchant or other location indicated by the merchant as the return location. In this step, the carrier can receive the package in a number of different ways. First, the carrier may go to the location of the customer and pickup the package as part of the regular pickup services provided by the carrier. Second, the customer may drop the package off at a 'drop-off' retail store operation affiliated with the carrier (such as a UPS Shipping Store). Third, the customer may drop off the package in a drop-off container having scheduled pickup times by the carrier.

The above represents one embodiment to illustrate the principles of the invention at a high level. Although some variations are disclosed in the above descriptions, further variations are possible. For example, instead of the carrier delivering the commercial invoice and then subsequently returning to pickup the package (thus necessitating two trips), the customer may bring the package to a retail drop off location, where the commercial invoice is then printed locally, and affixed to the package. The carrier (or agent thereof) may provide an additional service of packaging the goods and preparing the appropriate documentation.

In another variation, after the customer has contact the merchant and indicated the goods to be returned, the merchant's shipping system automatically provides the information to the carrier's IDR system regarding the goods to be returned. The merchant also provides an email address (of the customer) to which the commercial invoice is to be sent by the carrier. The carrier's IDR system then generates an image or other related information of the commercial invoice, and transmits the invoice in an email message to the customer. Alternatively, the IDR system could send an email message to the user with a web-address (e.g., URL) instructing the customer to select the link, resulting in the user reaching a returns processing web page operated by the IDR. The IDR system then presents the customer with the commercial invoice, as well as allows the user to select additional options (e.g., upgrading the class of service for an up-charge, providing the customer with tracking information, etc.).

In the embodiments disclosed above, the carrier's IDR system maintains certain information about the original commercial invoice which is used to generate the return commercial invoice. The merchant or the customer may have to provide additional information for the carrier to be able to generate the return commercial invoice. This would include the items being returned and whether a different address is to be used (e.g., the return address is not the original consignor's address, but could be the address of a third party returns processor agent under contract with the merchant).

In many cases, a merchant (or third party returns processor) may operate a dedicated returns processing warehouse, so that returns are not sent to the same address which originated the original delivery. In other words, simply 'swapping' the consignor and consignee address may not be appropriate when returning the good. In some embodiments, the carrier will select the appropriate returns address from a list of addresses using rules established by the merchant. For example, a national on-line retailer may drop ship goods from the manufacturer, and all return goods should be sent to the appropriate manufacturer. Other retailers may have different warehouses based on geography (e.g., goods from certain countries are sent to warehouse "A" whereas goods from other countries arc send to warehouse "B").

Other information may be merely copied from the original commercial invoice. For example, the customer (the consignee in the original shipment) usually is the same address as the consignor in the return shipment. Further, when a product is being returned, typically the original product description and harmonized tariff code should be the same as when original sent, as is the value of the good.

Figure 3A:
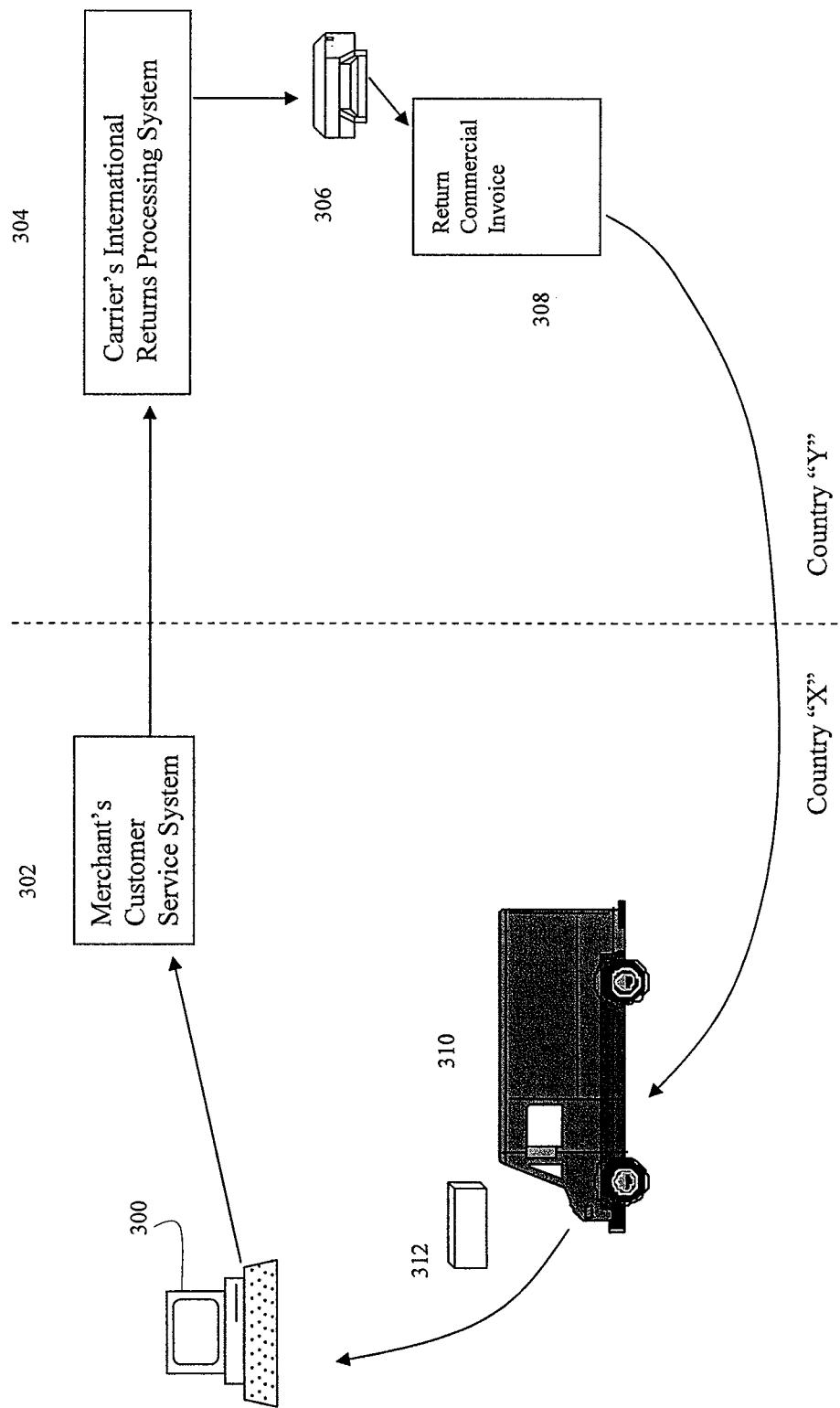
FIG. 3a illustrates various system components involved in one embodiment of the present invention.
Figure 3B:
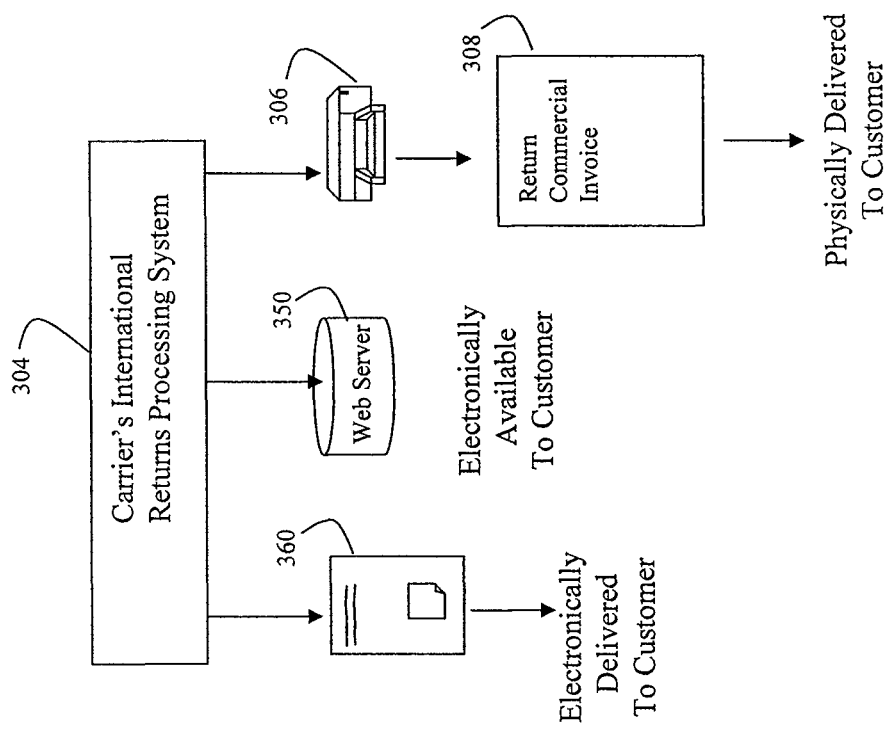
FIG. 3b illustrates various system components involved with generating various forms of a commercial invoice according to various embodiments of the present invention.

The system elements involved are shown in FIG. 3a, and correspond to the method steps shown in FIG. 2. In FIG. 3b, the process begins with the customer 300 initiating contact with the merchant. In this embodiment, for the sake of illustration, the customer uses a computer 300 to contact a web-server 302 operated by the merchant. The user will typically select a "Return" icon on an appropriate web page dedicated for performing returns processing. The merchant's web server will retrieve the original order information based on identifying data from the customer, which includes information associated with the original commercial invoice. The merchant's system then communicates with the carrier's IDR processing system 304. In this embodiment, the communication is accomplished using an application programming interface (API) over a communications network (e.g., the Internet). Typically, this involves the carrier providing specialized software to the merchant for coordinating returns processing communication, which may be part of the shipping system software used by the merchant. This functionality may be installed on the merchant's shipping system.

The IDR processing system 304 then generates the return commercial invoice (and/or other related documents). In this embodiment, the return commercial invoice (and other documents, such as the return shipping label, instructions, return processing label) is printed in the same country as where the IDR system is located. In other embodiments, the commercial invoice can be printed in the same country as the customer and is affixed to the packaged shipped to the customer. In this case, the carrier can electronically transmit the commercial invoice across the border to the other country where the commercial invoice is printed and then delivered locally (which reduces the overall delivery costs). The delivery of the commercial invoice 312 is typically accomplished using the carrier's delivery vehicle's 310 to the customer (though other means could be used).

Turning now to FIG. 3b, various embodiments are disclosed for the generation and transmittal of the commercial invoice by the carrier. FIG. 3b illustrates the carrier's IDR system 304, which can generate the commercial invoice in various ways, based on criteria established by the carrier.

The first approach discussed is to electronically deliver the commercial invoice 360 to the customer. As discussed herein, there are several precursor steps that can occur in order to transmit the information to the customer. One typical embodiment involves generating an email with a separate attachment (e.g., a PDF file or GIF formatted image). The attachments could be created by scanning a physically printed version of the document. Another typical embodiment involves the user interacting at a web site hosted by a web server 350, where the image is dynamically created and presented to the customer. Thus, a web server 350 may be used by the carrier IDR system to either store the commercial invoice for subsequent retrieval by the customer, or the customer may access the web server and interact so as to provide further information allowing the commercial invoice to be created and then provided to the customer. In this embodiment, the web server may be co-located with the carrier's IDR system (or even integrated with the IDR system) or the web server may be located in another country, remote from the IDR server. For example, the carrier may deploy a limited number of such returns processing web servers to serve a geographic region spanning multiple countries. Finally, as discussed earlier, another embodiment involves printing out the commercial invoice using a printer 306, after which the commercial invoice is physically delivered to the customer. In some embodiments, the merchant can physically print a copy of the commercial invoice and arrange to deliver it to the customer.

In other embodiments, the carrier can provide the return commercial invoice to the merchant, who in turn provides it to the customer. The carrier can electronically provide it to the merchant, who could mail it, or otherwise electronically forward it to the customer. In this manner, the merchant has retained control of the customer, and does not let the customer interface with the carrier. In other embodiments, the merchant may redirect the customer to the carrier's web site, and let the customer interact solely with the carrier. These and other variations are within the scope of the present invention.

Figure 4:
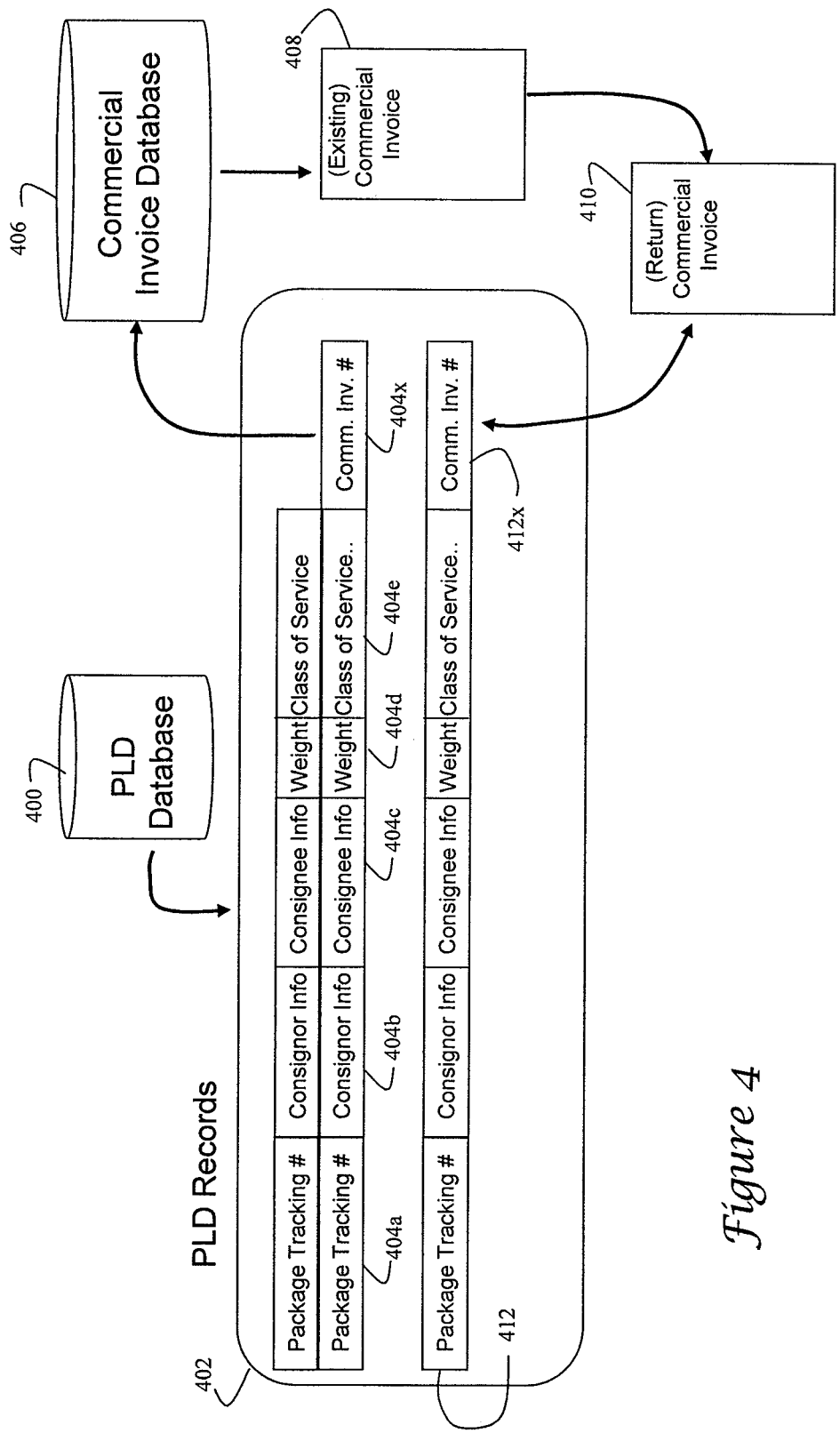
FIG. 4 illustrates one embodiment of the database record structure and architecture of one embodiment of the present invention.

FIG. 4 illustrates one embodiment of how the commercial invoice is stored and used for subsequent generation of a return commercial invoice. FIG. 4 illustrates the package level detail ("PLD") database 400, which stores information 402 about packages, in the form of records. Each record 404 typically comprises a number of fields which contains data pertaining to various aspects of the package being delivered. The exact format and structure of the record can vary and still be within the scope of the principles of the present invention. Looking at an exemplary record, the first field comprises a package tracking number 404a, which can be used to index the record, and identify the particular package for tracking purposes. Typically, the customer and merchant (e.g., consignee and consignor) have knowledge of the tracking number. The next fields include the consignor and consignee fields, 404b, 404c, which include name, address, city, state and country information. In this case, it is presumed that the consignor and consignee are in different countries. Other fields are typically present in a PLD record, including the weight of the package 404d, and the class of service 404e.

The record shown 404 includes an indication of the presence of a commercial invoice number field 404x. (In other embodiments, this can be implicitly indicated when the consignor and consignee are in different countries.) The field indicates a commercial invoice identifier that can be used to access a copy of the commercial invoice stored in the commercial invoice database 406. There are alternative embodiments that can accomplish the same function. For example, a commercial invoice flag could signify that a commercial invoice does exist, and that the appropriate commercial invoice record can be found by using the package tracking number as the identifier in the commercial invoice database. In this case, the commercial invoice database would index the commercial invoices by tracking number.

Other database architecture schemes will be readily apparent to those skilled in the art. For example, the merchant may electronically provide a RMA or RPN number to the carrier, which the carrier then links with the return commercial invoice and/or return shipping number. This allows the merchant (and/or a possible third party returns processor) to track the return shipment from the very beginning when the customer provides the return package to the carrier.

The commercial invoice database stores information about the commercial invoice. It is possible that several packages may be associated with the same commercial invoice 408. The commercial invoice database can store the commercial invoice information in different forms, from images of the invoice (e.g., pdf, gif, bitmap, or other formats), to information stored in the fields of database records (or both).

The IDR system can generate a return commercial invoice 410 once the IDR system knows the original (or existing) commercial invoice 408. The process can be summarized as follows: the IDR system receives information, typically a package tracking number, from a merchant indicating that certain items are requested to be returned by a customer. The IDR system is able to retrieve the existing commercial invoice for that package. The IDR system is also informed as to which items in the package are to be returned. If the package contained only one type of good, then the selection may default to that type. Often, there may be different types of good in a single package, and the IDR system has to know which and how many of the goods are being returned. The IDR system can use the information provided by the merchant along with the information from the existing commercial invoice 408 to generate the return commercial invoice. As noted, the return commercial invoice (and other documents) can be generated either physically or electronically. As noted previously, the commercial invoice can be provided to the customer in a variety of ways.

In many embodiments, the IDR system may also generate a return shipping label (and other documents including RMA or PRN labels) to accompany the commercial invoice. In such embodiments, the IDR system may allocate and associate a package tracking number for the return shipment. Thus, the return commercial invoice is linked to a return package tracking number and return processing number. In FIG. 4, the return package tracking number is shown as record 412, which has a commercial invoice number 412x field comprising the commercial invoice number of the return commercial invoice 410. This allows the IDR system to retrieve the return commercial invoice if required, using the package tracking number of the return package. In other embodiments, the RMA or PRN number is used in lieu of the commercial invoice number. However, the presence of the number in the PLD record indicates that the return commercial invoice could be retrieved from the commercial invoice database using the tracking number.

It should be noted that the tracking number form or address space may be unique to a particular country. Thus, a carrier may have a particular tracking number address space for each country or subsets thereof.

System Architecture

Figure 5:
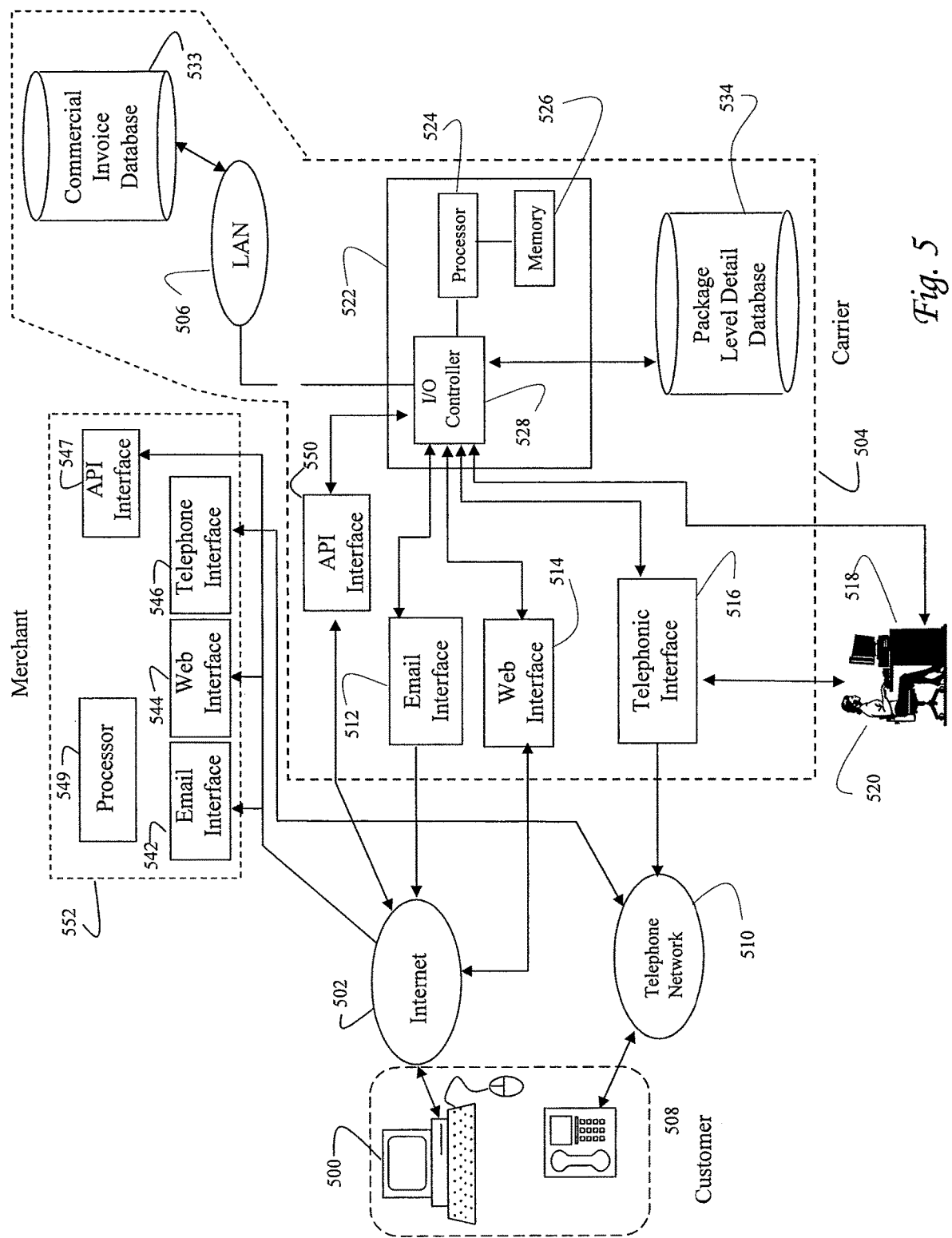
FIG. 5 illustrates one embodiment of a system wide architecture involving a customer, merchant and a carrier.

FIG. 5 illustrates one embodiment of the overall system architecture involved in processing an international dutiable return. In FIG. 5, a customer location 501 is illustrated as comprising various communication devices that a customer may use in contacting the merchant, both for ordering and for initiating a return. Different forms may be used at different times, and other forms (cell phone, pager, fax, PDA, etc.) may be used. The customer can also use the same communication devices for communicating with the carrier, and for performing other related functions, such as tracking the return packages.

The customer computer 500 is typically connected to the Internet 502, using any of the well known methods for accomplishing the connection, including cable modems, DSL, wireless access, etc. The telephone 508 is typically connected to a telephone network 510, although other forms are within the scope of the invention (including wireless, voice over IP, etc.)

The present invention concerns the return of merchandise, but it is beneficial to review the overall process beginning with the customer's ordering of the merchandise. In this embodiment, the customer uses the computer 500 to communicate over the Internet 502 via a web-interface 544 operated by a computing system 522 by the merchant. The merchant's computer system involves a processor 549, and incorporates interfaces for communicating via email 542, a web site 544, and via telephone 546. In addition, the system provides an application programming interface ("API") 547 for communicating with the carrier's system.

The merchant's system is shown as a single system for purposes of ease of illustration, but may comprise various interconnected or distributed computing systems. For example, the API interface may be installed on a standalone shipping system, which is common in many business environments for on-line merchants.

The use of the API interface and the software in the merchant's shipping system may impact the use of certain reference numbers to identify the return transaction. The merchant may allocate commercial invoice numbers unilaterally. If so, then it is likely that the carrier would be unable to uniquely identify the return commercial invoice in the commercial invoice database (e.g., two merchants could pick the same number). If the carrier allocates the commercial invoice number, then the carrier would ensure that the value in unique. If, on the other hand, the merchant uses the tracking number (which is unique to the carrier) then this value could be used to identify the commercial invoice. Finally, the merchant may desire to use a third party return processing number, to facilitate tracking the processing of the returned merchandise by the third party returns processor. The carrier can accept any of such identifiers, and link the return commercial invoice to each of the merchant's numbers. Further, the carrier can provide machine readable return processing labels using electronic tags (e.g., RFI tags) or printed labels (e.g. bar coded labels) for the customer to affix to the package providing information about the additional identifiers.

The customer is presumed to interact with the merchant's web-server for purchasing the goods. The customer will provide the appropriate payment information, including, typically, a credit card or other letters of credit. The shipping information is also provided (e.g., consignee address). Thus, the merchant's system has all the information required from the customer to ship the goods and complete a commercial invoice.

The merchant uses the API interface 547 to communicate with the carrier via a corresponding API interface 550 to generate the appropriate shipping labels for the shipment. Further, the merchant, or the carrier, can generate the information associated with the commercial invoice. The merchant can rely on a service provided by the carrier to generate the commercial invoice and provide it with the package to the carrier.

The carrier's system comprises a processor 522 and memory 526 as is well known in the art and a corresponding API interface 550. The carrier's system will also maintain a record of the package level information in a PLD database 534 wherein the record is associated with the original shipment. For international shipping, the carrier's system may also facilitate generating a commercial invoice. Typically (though not required), the commercial invoice is stored in the commercial invoice database 533, which the processor 502 communicates with using a LAN 506. In other embodiments, the commercial invoice database is a logical database that is physically located with PLD database or integrated therein. Various physical implementations of the logical entities are possible. The generating of the shipping label and the corresponding commercial invoice is accomplished by the system 504 using procedures well known in the art. The carrier may also store images of the other documents (or information thereof) provided to the customer in conjunction with the commercial invoice. Thus, return shipping labels, RMA labels or RPN labels may be also stored in the commercial invoice database, or in a separate database. The commercial invoice could then associated or linked to each of these as being related, so that an identifier provided identifying one of the labels, could then easily allow identification of other information. For example, the IDR system may retrieve the return commercial invoice, return shipping label, and return processing label given one of the commercial invoice number, return tracking number, or return processing number.

At this point, (not shown in FIG. 5), the merchant then picks the goods to be shipped from a warehouse, packages the goods, generates the necessary documentation, and ships the goods. FIG. 5 does not show where the goods are shipped from, but it is presumed that the goods originate in a different country from where the customer has designated as the ship-to-address. It is not a requirement that the merchant's web site, or other components of the IDR system be in located in the same country as where the goods are shipped, or where the customer has indicated the ship-to-address.

At this point, the carrier's PLD database has stored detailed information identified by the package tracking number regarding the shipment, including an indication of the associated commercial invoice number. The carrier's commercial invoice database 533 also stores the contents of the commercial invoice, so that its information can be readily retrieved if needed, Subsequently, after receiving the goods, the customer contacts the merchant to arrange for certain of the goods to be returned. The contact may occur via the telephone 508 or via the computer 500. Assuming this occurs via the computer 500, the user interacts with the merchant's web interface to indicate which goods from the indicated order are to be returned. Typically, the customer will identify themselves and identify the particular order or invoice number to identify the original order. The customer will also indicate the specific goods to be returned.

The merchant will then communicate with the carrier to coordinate the generation of the return commercial invoice (and any other associated return shipping documents, such as a shipping label). This may be done serially or in real time while interacting with the customer. In one embodiment, the merchant's customer representatives (not shown) uses the telephone interface 546 to communicate via the telephone network 510 to a carrier customer service representative ("CSR") 520. The CSR can solicit the information identifying the order or commercial invoice, and use the IDR system 504 to retrieve the appropriate commercial invoice from the commercial invoice database 533.

However, in a preferred embodiment, the merchant will use the API 547 to communicate in a computer-to-computer manner without human intervention. The communication from the merchant's system 552 to the carrier's IDR system 504 will typically indicate that a return of international dutiable good is to be initiated, and will identify the original commercial invoice in some manner (e.g., directly by commercial invoice number or indirectly, such as via the tracking number of the original shipment, or an RMA/RPN number). The merchant may indicate an alternative address to which the goods are to be returned, and the specific goods that are to be returned. The IDR system will typically verify the information, including that the goods to be returned were originally indicated in the original commercial invoice.

The carrier's IDR system may solicit or require further information used in generating the return commercial invoice (including class of service, alternate consignee address, payment arrangements for shipping charges, payment arrangements for duties, etc.). The carrier's IDR system generates the commercial invoice, and stores the related data and/or image in the commercial invoice database. The generation of the commercial invoice will typically contain information shown as embodied in FIG. 1, but it will not be signed (either manually or electronically). The carrier's IDR system only prepares the commercial invoice, but does not complete its execution, as the customer packaging the returned goods is the appropriate entity to certify the accuracy of the document.

The IDR system may also generate other documents, including a return shipping label. This may be accomplished by the IDR system itself, or by other systems which the IDR system communicates with. The IDR system, as described before, associates any package tracking number generated by the return shipping label process with the return commercial invoice.

In other embodiments, the return shipping label may be subsequently generated by the merchant, according to existing procedures for generating shipping labels. If so, then at the time the shipping label is generated, the association can be then established between the return package tracking number and the return commercial invoice.

The system shown in FIG. 5 also facilitates the customer receiving the commercial invoice (and other documents, if so). As discussed, one embodiment involves the IDR system 504 printing a physical copy via a locally or remotely attached printer (not shown). The documents are then shipped to the customer using services provided by the carrier or other carriers. The preferred embodiment is for the IDR system to provide or make available the document(s) electronically. There are several ways in which this can be done.

Customer Receives Commercial Invoice via Email

In one embodiment, the customer receives the commercial invoice as an attachment to an email message. The email message can be sent by the merchant or the carrier's IDR system. In the first embodiment, the carrier's IDR system transmits the commercial invoice as a PDF file to the merchant, with an indication identifying the customer or a particular return transaction. The merchant's system 552 then forwards (or copies the attachment in a new email) and transmits the attachment to the customer. The merchant uses the email address of the customer provided either when the order was first placed or using a separate email address conveyed when the customer initiated the request to return the goods.

In a second embodiment, the merchant's system provides the appropriate email address to the carrier's IDR system and the carrier's IDR system 504 transmits the email using an email interface 512 to the customer. Either approach of the first of second embodiment results in the transmittal of the commercial invoice (and/or other documents). In instances where the customer initiates the return with the merchant via telephonic communication, or where the merchant initiates the return with the carrier via telephonic communication, use of an email transfer of the commercial invoice may be preferential.

Customer Receives Commercial Invoice via Web Server

Another embodiment for providing the commercial invoice (including other documents) to the customer is to generate or present the commercial invoice to the user via a web site. In this case, there are multiple embodiments. First, the user may initiate the return by interacting with the merchant's web interface 544. The merchant's system may interact via the API interface 547 with the API 550 of the carrier's IDR system 504 such that the carrier provides the commercial invoice to the merchant in response to a request, and the merchant's server then in turn presents the completed commercial invoice to the customer. In this case, the merchant's system requires custom software in order to integrate the functionality with their web site. This may occur in real time while the customer is interacting with the merchant's web site.

In another embodiment, the merchant's web site may merely present to the customer a link (e.g., URL) to the carrier's web interface 514, resulting in a new browser window originating from the carrier appearing to the user. The carrier's web interface would then interact with the customer and present the commercial invoice.

Customer Receives Commercial Invoice via Other Means

It should become apparent that various other combinations are possible. For example, either the carrier, or the merchant, could transmit an email to the customer with a URL (web-site address) identifying a web site for receiving the commercial invoice. Other embodiments include sending a 'servlet' or Java application code in an email message, or downloading the servlet or Java code from a web site and having the commercial invoice generated locally on the customer's computer. These and other variations fall with the scope of providing, transmitting, presenting, or otherwise electronically furnishing the commercial invoice to the customer.

Other Miscellaneous Aspects

When providing the commercial invoice, other documents or information (such as instructions, RMA or RPN labels) may be provided to the customer. The shipping label can be provided as a separate attachment, as can instructions to the user, indicating how to package, return, and complete the appropriate documentation. Further, the contents of the commercial invoice (as can the other documents) can be produced on a separate, machine readable label, such as using a RFID tag, bar code, or two-dimensional bar code. Having a machine readable barcode indicating all or part of the commercial invoice can be used by the recipient of the returned merchandise to quickly process the goods. This also applies to the RMA or RPN number, and the encoding of these numbers can include other information, including that which is also included in the commercial invoice.

In addition to these labels, the user can be provided with information of the nearest retail drop-off location, including address, maps, and contact information, as well as maps and locations of drop-off collection boxes. The IDR system would utilize the consignor's (e.g., customer in this case) address to determine the closest location of a retail store, drop-off location, or drop-off collection box.

The diagram in FIG. 5 does not disclose any international boundary line with respect to the customer, merchant's system, and the carrier's system. Typically, the location of the actual systems or components is not relevant to where the return package is shipped to. For example, all the components of the system can be located in different countries or in the same country as the customer. The only requirement for an international return is that the ship-to address of the package is in a different country relative to the country of the customer where the package originates.

In some of the embodiments, when the customer is presented with the electronic forms (including the commercial invoice), it is presumed that the customer will print the forms locally using a printer (not shown in FIG. 5). In other embodiments, the customer may go to a retail shipping store operated by the carrier, and arrange for the commercial invoice (and other documents, such as the shipping label) to be printed in the retail store. The commercial invoice could be signed at the store by the customer. In other embodiments, the customer may grant a power of attorney to the shipping store personnel to pack and sign the commercial invoice on behalf of the customer.

The above embodiments presume that the customer provides the signature to the physical forms. Depending on the local laws, other embodiments are possible with respect to the customer providing the signature. The carrier could provide a set of electronic forms available for viewing by the customer, and the customer could electronically sign to attest to their accuracy, at which a reference number is provided to the customer. This type of electronic signature may be accomplished by the customer clicking an icon to certify the commercial invoice or use a mouse, stylus, or other pointing device to sign the customer's name on-line. The customer can then package the good, and provide the package to the carrier at a retail store or other facility bearing the reference number, which the carrier then uses to identify the appropriate international documents. The carrier then (at a facility initially receiving the package) affixes the appropriate documentation to the package as a service to the customer. Because the customer has linked the package with the set of documents, and averred as to the accuracy of the documents, this may comply with local regulations or statutes requiring the consignor to declare the contents of the package. In other instances, the customer may be required to grant a power of attorney.

In the above illustrations, the entities were described in terms of "customer" and "merchant", since the terms consignor and consignee can be misinterpreted since they depend on the stage of the process. Namely, when initially shipping the purchased good, the merchant is the consignor and the customer is the consignee. However, upon returning the good, the customer is the consignor and the merchant is the consignee. However, the invention is not limited strictly to a "customer" or "merchant" but can apply to sending goods, including documents, to law firms, insurance firms, business-to-business manufacturing applications, etc. The scope of the invention can apply to various situations in which goods are returned to the originating party in a different country.

That which is claimed:

1. A method for facilitating a return of international dutiable goods including a good purchased by a customer from a merchant wherein the good is shipped internationally from the merchant to the customer, the method comprising:

correlating, via a processor of a network device, in a commercial invoice database a plurality of records each respectively linked with a plurality of commercial invoices, including a first commercial invoice linked with a completed delivery of an international shipment of the good from the merchant to the customer wherein the first commercial invoice is linked with a first package tracking number and a first commercial invoice number, the first commercial invoice indicating the good, a harmonized tariff code linked with the good, and a quantity and value of the good;

generating, via the processor of the network device, a label comprising machine readable indicia encoded by the processor to indicate the good of the first commercial invoice, the label affixed on a package of the good shipped internationally;

correlating, via the processor of the network device, in the commercial invoice database a second commercial invoice linked with a second package tracking number, wherein the second package tracking number is linked with a return shipment of the good;

correlating, via the processor of the network device, in a package level detail ("PLD") database, a plurality of records each respectively linked with a plurality of packages, including a first PLD record identified by the first package tracking number and a second PLD record identified by the second package tracking number;

facilitating storage, via the processor of the network device, in the PLD database of an indication in the first PLD record of the first commercial invoice;

receiving an electronic request via a communication network, at an application program interface (API) located at a carrier server, for generating the second commercial invoice, the electronic request comprising an identification of the first commercial invoice and identification of the good of the first commercial invoice to be returned;

generating, via the processor of the network device, an image of the first commercial invoice;

retrieving, via the processor of the network device, the first commercial invoice;

generating, by the processor of the network device, the second commercial invoice to utilize for international return of the good to the merchant based on using the identification of the good in the image of the first commercial invoice;

linking the second commercial invoice with the second package tracking number;

facilitating storage, via the processor of the network device, in the commercial invoice database of the second commercial invoice;

facilitating storage, via the processor of the network device, in the PLD database of the second PLD record;

providing, via the processor of the network device, the second commercial invoice along with the second package tracking number through the API located at the carrier server that communicates with a corresponding API located at a server of the merchant while a customer computing device is interacting with a merchant website, wherein the second commercial invoice and the second package tracking number is provided without the carrier server interacting with the customer computing device through a selection of a link that opens a new browser window that allows the customer computing device to interact with a carrier web interface associated with the carrier server;

correlating, via the processor of the network device, in the PLD database the linkage between the second package tracking number and the second commercial invoice; and determining, via the processor of the network device, a closest location, among a plurality of locations, to the customer for drop-off of the good for international return of the good to the merchant.

2. The method of claim 1, further comprising: generating a return shipping label indicating the second package tracking number.

3. The method of claim 2, further comprising: storing, in the commercial invoice database, the return shipping label; and linking the return shipping label with the second commercial invoice.

4. The method of claim 2, wherein receiving an electronic request via a communication network, at an API located at a carrier server, for generating the second commercial invoice comprises receiving the electronic request from a computer system operated by the merchant.

5. The method of claim 2, further comprising: transmitting the second commercial invoice as an attachment to the customer.

6. The method of claim 2, further comprising: facilitating printing of the second commercial invoice for purposes of delivering the second commercial invoice to the customer.

7. The method of claim 3, further comprising: storing, in the commercial invoice database, a return processing label; and linking the return processing label with the second commercial invoice.

8. The method of claim 5, further comprising: transmitting a return processing label as a second attachment to the customer.

9. The method of claim 1, further comprising: verifying that the good is not restricted from being returned internationally.

10. The method of claim 1, wherein: the generated label comprises a RFID tag.

11. A computer program product comprising at least one non-transitory computer readable storage medium for facilitating a return of at least one international dutiable good wherein the good is shipped internationally, the at least one non-transitory computer readable storage medium comprising computer-executable software which in response to execution by a processor causes a network device to at least:

correlate, in a commercial invoice database, a plurality of records each respectively linked with a plurality of commercial invoices, including a first commercial invoice linked with a completed delivery of an international shipment of the good from a merchant to the customer wherein the first commercial invoice is linked with a first package tracking number and a first commercial invoice number, the first commercial invoice indicating the good, a harmonized tariff code linked with the good and quantity and value of the good;

generate a label comprising machine readable indicia encoded by the processor to indicate the good of the first commercial invoice, the label affixed on a package of the good shipped internationally;

correlate, in a commercial invoice database, a second commercial invoice linked with a second package tracking number, wherein the second package tracking number is linked with a return shipment of the good;

correlate, in a package level detail ("PLD") database, a plurality of records each respectively linked with a plurality of packages, including a first PLD record identified by the first package tracking number and a second PLD record identified by the second package tracking number;

store, in the PLD database, an indication in the first PLD record of the first commercial invoice;

receive an electronic request via a communication network, at application program interface (API) located at a carrier server, for generating the second commercial invoice, the electronic request comprising an identification of the first commercial invoice and identification of the good of the first commercial invoice to be returned;

generate an image of the first commercial invoice;

retrieve the first commercial invoice;

generate the second commercial invoice to utilize for international return of the good to the merchant based on using the identification of the good in the image of the first commercial invoice;

linking the second commercial invoice with the second package tracking number;

store, in the commercial invoice database, the second commercial invoice;

store, in the PLD database, the second PLD record;

provide the second commercial invoice along with the second package tracking number through the API located at the carrier server that communicates with a corresponding API located at a server of the merchant while a customer computing device is interacting with a merchant website, wherein the second commercial invoice and the second package tracking number is provided without the carrier server interacting with the customer computing device through a selection of a link that opens a new browser window that allows the customer computing device to interact with a carrier web interface associated with the carrier server;

correlate, in the PLD database, the linkage between the second package tracking number and the second commercial invoice; and determine a closest location, among a plurality of locations, to the customer for drop-off of the good for international return of the good to the merchant.

12. The computer program product of claim 11, wherein the computer-executable software in response to execution by the processor further causes the network device to: generate a return shipping label indicating the second package tracking number.

13. The computer program product of claim 12, wherein the computer-executable software in response to the execution by the processor further causes the network device to: store, in the commercial invoice database, the return shipping label, and link the return shipping label with the second commercial invoice.

14. The computer program product of claim 13, wherein the electronic request is received from a communication device operated by the merchant.

15. The computer program product of claim 14, wherein the computer-executable software in response to execution by the processor further causes the network device to: transmit the second commercial invoice as an attachment to the customer.

16. The computer program product of claim 14, wherein the computer-executable software in response to execution by the processor further causes the network device to: print the second commercial invoice for purposes of delivering the second commercial invoice to the customer.

17. The computer program product of claim 11, wherein the computer-executable software in response to execution by the processor further causes the network device to: store, in the commercial invoice database, a return processing label; and link the return processing label with the second commercial invoice.

18. The computer program product of claim 11, wherein the computer-executable software in response to execution by the processor further causes the network device to: transmit a return processing label as an attachment to the customer.

19. The computer program product of claim 11, wherein the computer-executable software in response to execution by the processor further causes the network device to: verify that the good is not restricted from being returned internationally.

20. The computer program product of claim 11, wherein the generated label comprises a RFID tag.

* * * * *